United States Patent [19]

Bogenhagen

[11] Patent Number: 5,150,983

[45] Date of Patent: Sep. 29, 1992

[54] CORNER LOCK

[75] Inventor: David R. Bogenhagen, Hudson, Wis.

[73] Assignee: Andersen Corporation, Bayport, Minn.

[21] Appl. No.: 638,832

[22] Filed: Jan. 8, 1991

[51] Int. Cl.⁵ .............................................. E06B 1/00
[52] U.S. Cl. ................................. 403/402; 52/656; 403/401; 403/295; 403/403
[58] Field of Search .............. 52/656, 200; 403/401, 403/402, 295, 403

[56] References Cited

U.S. PATENT DOCUMENTS

| | | |
|---|---|---|
| 111,128 | 1/1871 | Linscott . |
| 1,242,815 | 10/1917 | Kohler . |
| 1,672,419 | 6/1928 | Lehman . |
| 1,817,162 | 8/1931 | Milligan . |
| 2,395,673 | 2/1946 | Krantz . |
| 2,538,138 | 1/1951 | Webster . |
| 2,872,711 | 2/1959 | Killebrew . |
| 2,916,112 | 12/1959 | Kiehl . |
| 3,051,517 | 8/1962 | Yalen . |
| 3,200,913 | 8/1965 | Nelson . |
| 3,642,310 | 2/1972 | Hudson . |
| 3,677,433 | 7/1972 | Collins . |
| 3,782,054 | 1/1974 | Goss, Jr. . |
| 3,829,226 | 8/1974 | Kreusel . |
| 3,848,390 | 11/1974 | Anderson et al. . |
| 3,854,245 | 12/1974 | Anderson . |
| 3,866,380 | 2/1975 | Benson . |
| 3,899,258 | 8/1975 | Matthews . |
| 4,076,438 | 2/1978 | Bos . |
| 4,090,799 | 5/1978 | Crotti et al. . |
| 4,124,322 | 11/1978 | Parisien . |
| 4,222,209 | 9/1980 | Peterson . |
| 4,296,587 | 10/1981 | Berdan . |
| 4,380,110 | 4/1983 | Harig . |
| 4,520,604 | 6/1985 | Halsey et al. ............... 52/200 |
| 4,635,410 | 1/1987 | Chumbley . |
| 4,750,302 | 6/1988 | Bechtold ...................... 52/200 |
| 4,924,631 | 5/1990 | Davies et al. ................ 52/656 |
| 4,930,275 | 6/1990 | Verby et al. ................. 52/200 |

FOREIGN PATENT DOCUMENTS

| | | |
|---|---|---|
| 1105596 | 4/1961 | Fed. Rep. of Germany . |
| 1193314 | 1/1965 | Fed. Rep. of Germany . |
| 685067 | 8/1966 | Netherlands . |
| 1264534 | 2/1972 | United Kingdom . |

Primary Examiner—Richard E. Chilcot, Jr.
Assistant Examiner—Wynn E. Wood
Attorney, Agent, or Firm—Merchant, Gould, Smith, Edell, Welter & Schmidt

[57] ABSTRACT

A corner lock (20) includes a first leg member (21) operatively connected to a second leg member (22). The leg members generally conform to a portion of the shape of the channel cavities of the sash members (11-14) which they are securing together. The leg members (21 and 22) each have threaded apertures (21g and 22g) formed for receiving fastening members (92 and 93). When the fastening members are tightened in the threaded apertures, the fastening members engage a first corner surface and move the leg members against the second corner surfaces, thereby tightening and securing the sash members together without the necessity of holes being formed in the sash members.

7 Claims, 5 Drawing Sheets

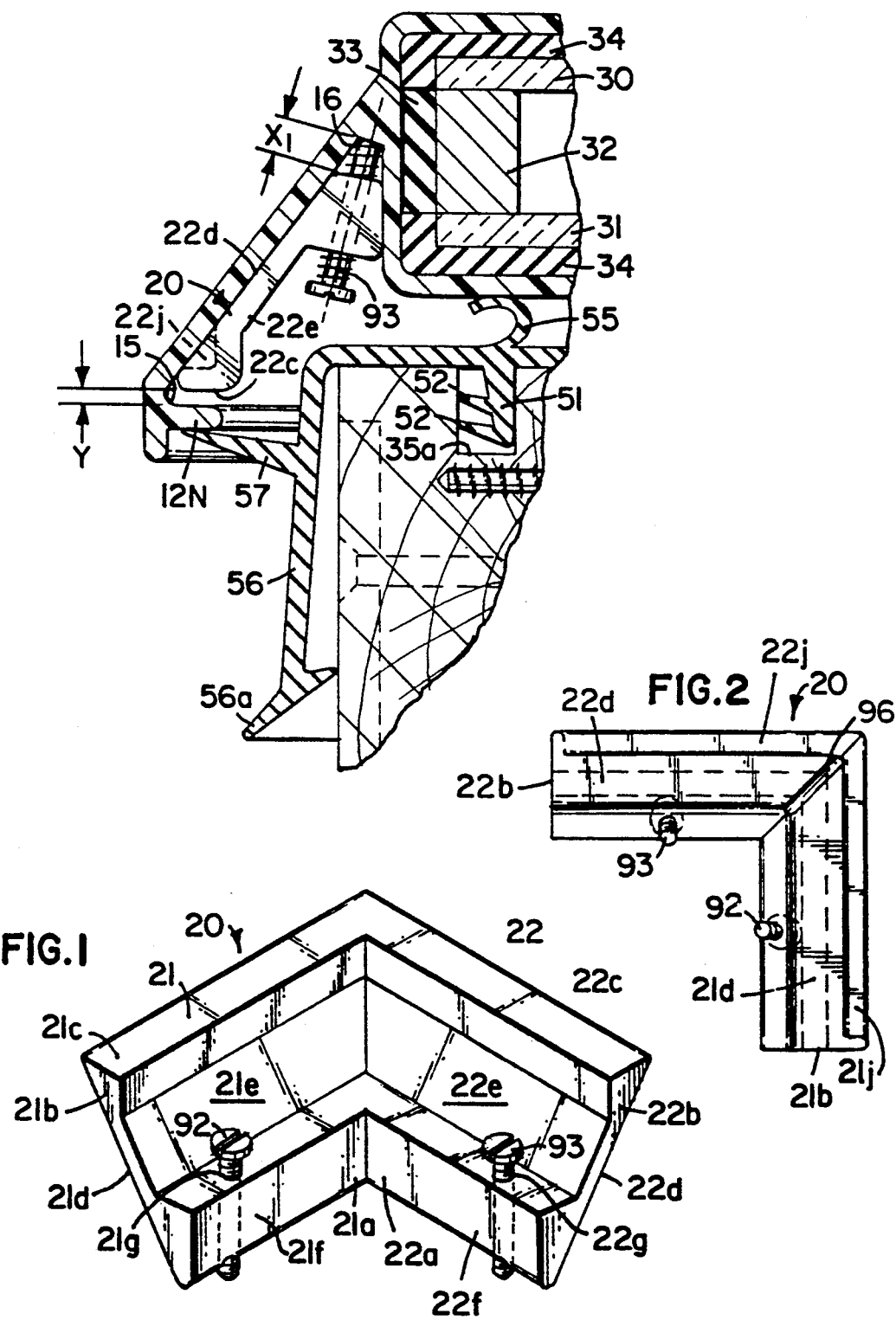

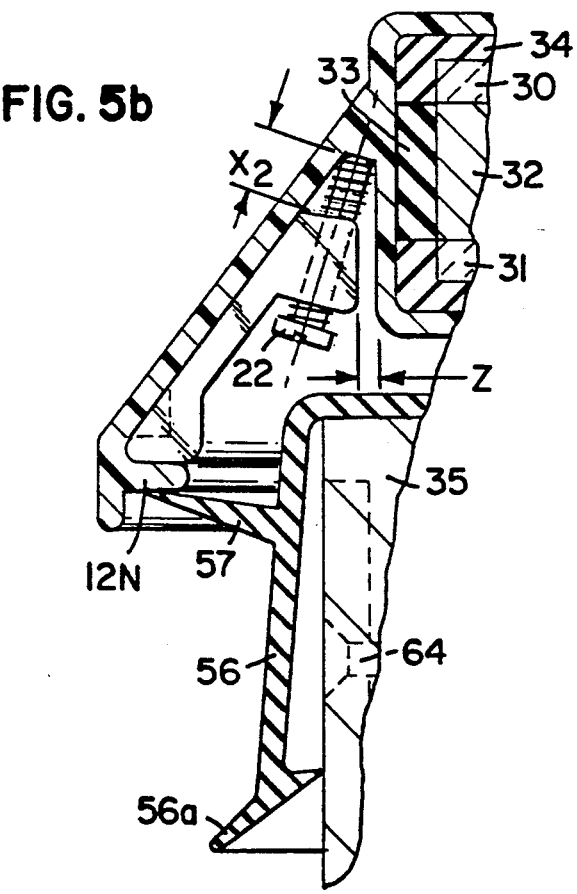

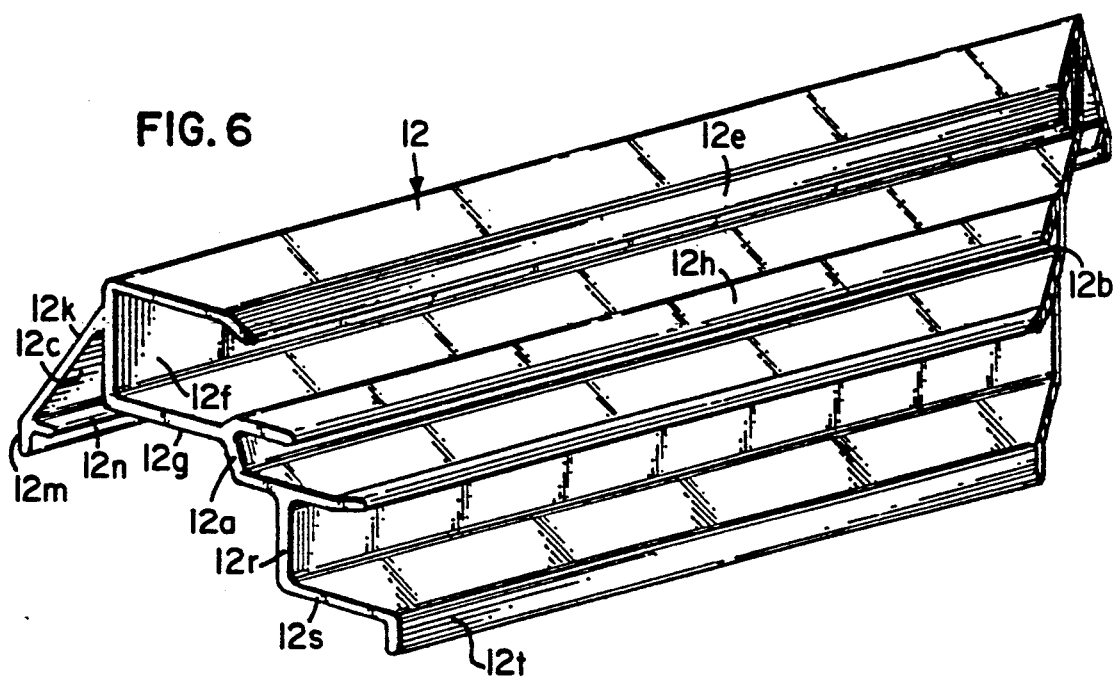
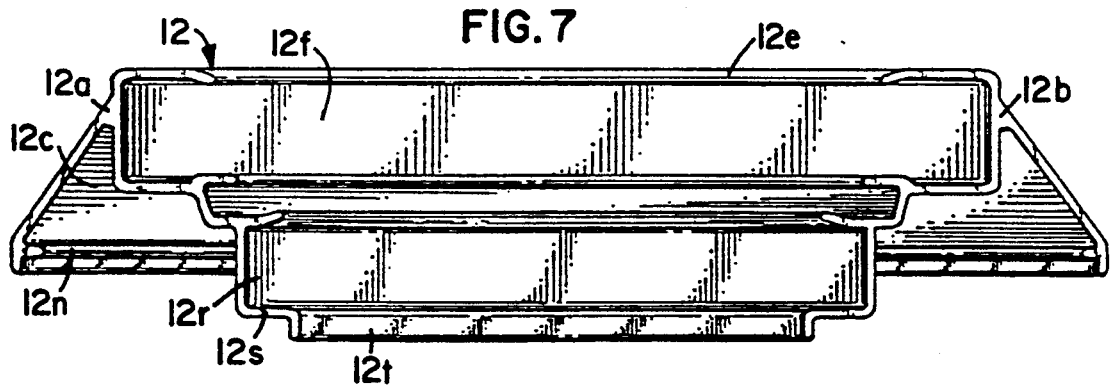
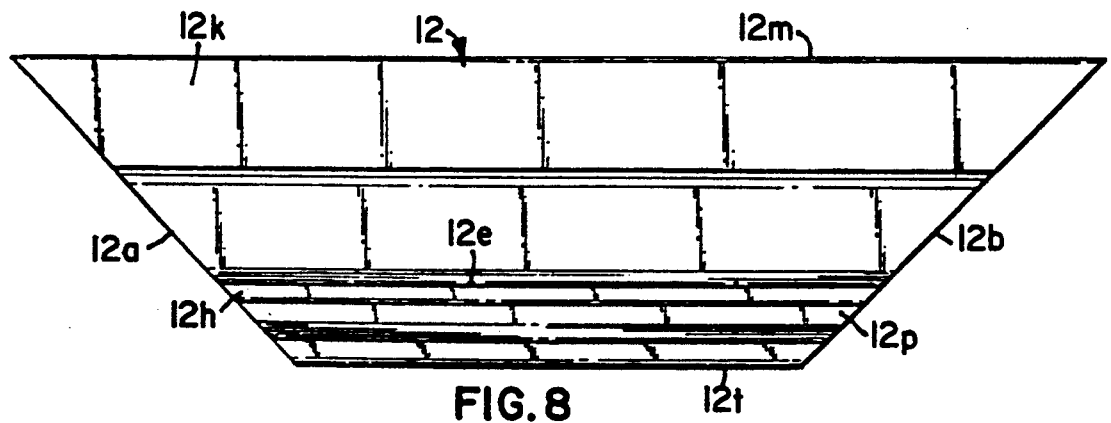

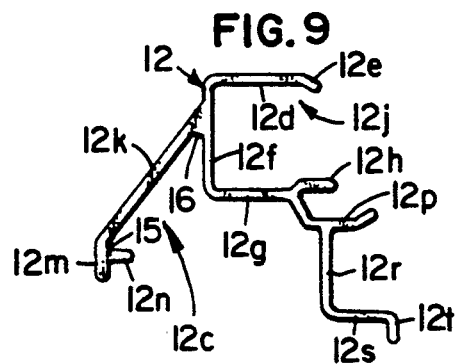
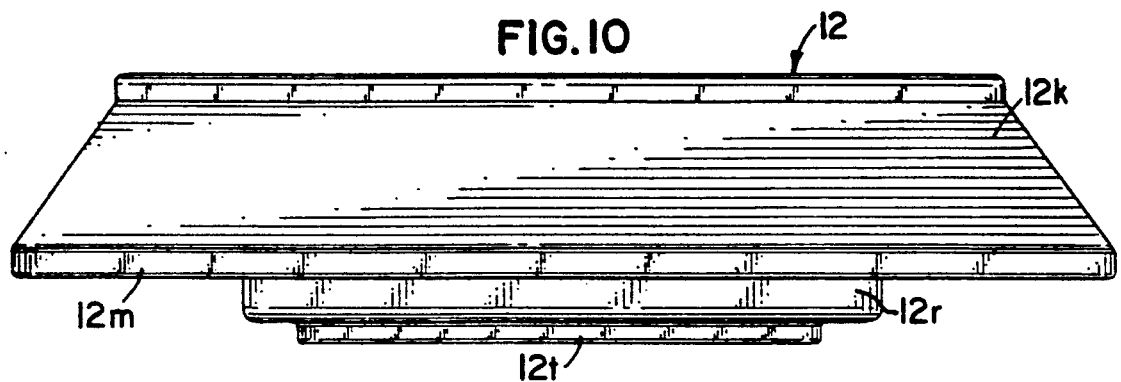
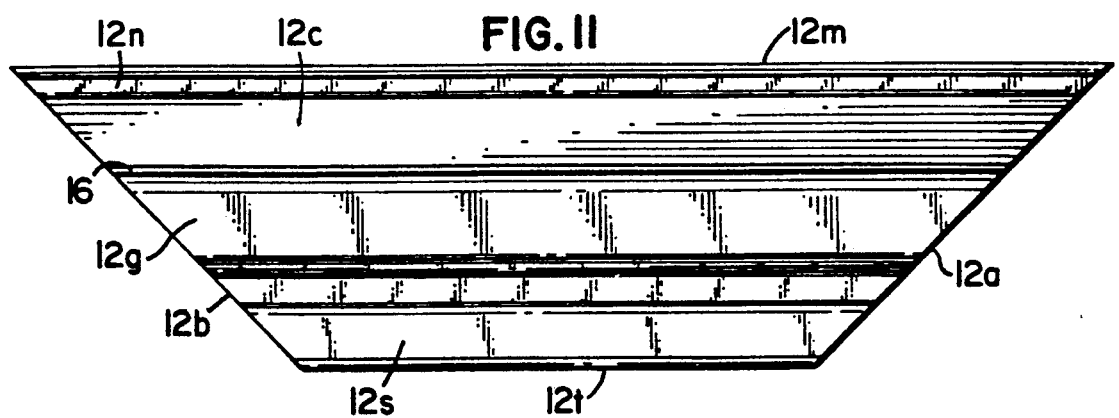

CORNER LOCK

BACKGROUND OF THE INVENTION

1. Field of the Invention

This invention relates generally to a corner fastener for use in securing first and second sash members together and more particularly to a corner fastener which is utilized to secure skylight sash members together to form a sash for a skylight.

2. Description of the Prior Art

Corner locks are well known in the window and door industry. Corner locks are used to join and secure two members together Typically, the members have a 45° mitre and when they are brought together, they for a 90° corner. The corner lock functions not only to secure the two members together, but also to assist in aligning the members so that the members are properly aligned along their 45° mitres so as to form a true 90° angle when the members are secured to each other. The joint angles do not necessarily have to be 90°. The joint angles could be 105°, 70°, 150°, etc. with corresponding mitre angles of one-half of the joint angle.

Typically, the corner index is off an outside surface of the frame and must rely on proper placement of the screw hole or friction fit for proper joining of the members There is usually no room for adjusting the mitre When using a friction fit it is difficult in assembly to do all of the force fitting of parts. Also, once fitted, you would have a questionable locking force to keep the lock from coming back out.

One example of an improved corner lock is seen in U.S. Application Ser. No. 321,730, filed Mar. 10, 1989. In that application, a corner lock is disclosed as having two leg members each with a threaded aperture Two screws are inserted through the frame and then into the leg members. As the screws are tightened, an offset in the leg members assists in aligning and adjusting the miters of the first and second frame members. While the corner lock described is also a non-friction type corner lock, it does have screws which go through the frame members. In certain instances, this may prove an aesthetic drawback. In addition, the operation of the corner lock is such that the tightening of the screw through the first leg causes movement of the second frame.

The present invention provides for an improved corner lock which is a non-friction corner lock and does not utilize holes which are drilled through the sash members.

BRIEF DESCRIPTION OF THE DRAWINGS

FIG. 1 is a perspective view of the corner lock in accordance with the present invention.

FIG. 2 is a bottom plan view of the corner lock shown in FIG. 1.

FIG. 5a is an enlarged cross-sectional view of a portion of FIG. 5 showing the corner lock in a loose (unengaged) position.

FIG. 5b is an enlarged cross-sectional view of a portion of FIG. 5 showing the corner lock in a tight (engaged) position.

FIG. 6 is a perspective view of one pultruded fiberglass sash member the skylight assembly shown in FIG. 3.

FIG. 7 is a front elevational view of the member of FIG. 6.

FIG. 8 is a top plan view of the member shown in FIG. 6.

FIG. 9 is a left side elevational view of the member shown in FIG. 6, the right side elevational view being a mirror image thereof.

FIG. 10 is a rear elevational view of the member shown in FIG. 6.

FIG. 11 is a bottom plan view of the member shown in FIG. 6.

SUMMARY OF THE INVENTION

The present invention is a corner fastener for use in securing first and second sash members together to form a corner of a sash. The sash members each have a mitred end and each sash member forms an opening and channel cavity at its mitred end. The channel cavities have a first channel cavity in the first sash member and a second channel cavity in the second sash member. The channel cavities having first corner surfaces and second, opposite corner surfaces. The fastener includes a first leg member having first and second ends and a second leg member also having first and second ends. The first ends are operatively connected to each other at an intersection. The leg members generally conform to a portion of the shape of the channel cavities. The leg members each have threaded apertures formed therein for receiving fastening members. The threaded apertures are in generally alignment to intersect with the respective first corner surfaces. When the fastening members are tightened in the threaded apertures, the fastening members engage the first corner surfaces and move the leg members against the second corner surfaces, thereby tightening and securing the sash members together without the necessity of holes being formed in the sash members.

In a preferred embodiment, the corner fastener is constructed of plastic and is a unitary, single piece fastener.

DETAILED DESCRIPTION OF THE PREFERRED EMBODIMENT

Figure 3:
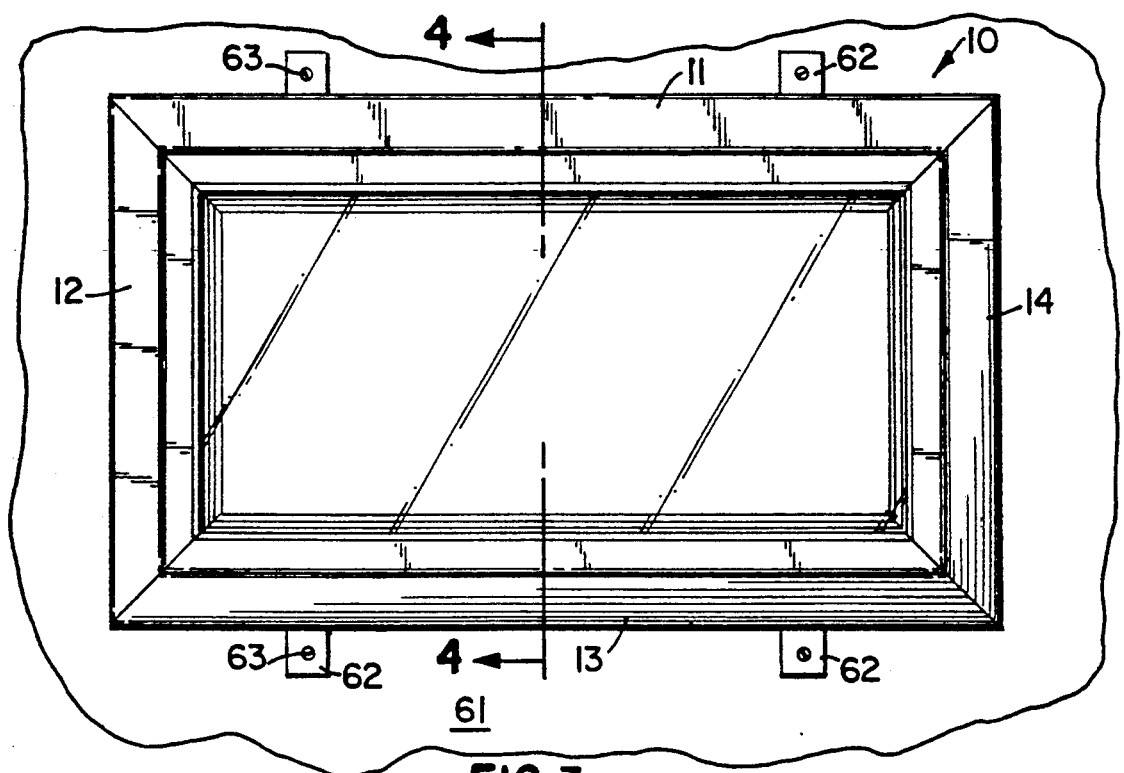
FIG. 3 is top plan view of pultruded fiberglass sash members joined together in accordance with the present invention.

Referring to the drawings, wherein like numerals represent like parts throughout the several views, there is generally disclosed at 10 a skylight assembly in FIG. 3. For a typical installation, the assembly 10 would be rotated 90°. The skylight of the assembly 10 includes four pultruded fiberglass sash member 11, 12, 13 and 14 operatively connected by means of four corner locks, generally designated at 20. The pultruded fiberglass sash members 11-14 are substantially the same except for the length of the pultruded fiberglass sash members. FIGS. 6-11 show a detailed view of one of the pultruded fiberglass sash members 12 and will be discussed in detail, realizing that the other pultruded fiberglass sash members 11, 13 and 14 are similar. The pultruded fiberglass sash member 12 has a first mitred end 12a and a second mitred end 12b. As can be best seen in FIG. 8, the mitre is at 45°. Therefore, when two pultruded fiberglass sash members are connected, a 90° corner is formed. However, it is understood other angles could also be formed.

Referring to FIGS. 6-11 and more particularly to FIG. 9, it can be seen that the pultruded fiberglass sash member 12 has an opening and forms channel cavity 12c. The pultruded fiberglass sash member 12 is a single, unitary piece and is formed by a pultrusion process and is formed of fiberglass. The fiberglass construction gives both the necessary structural and thermal properties which are advantageous for a skylight sash member. A plastic or PVC frame would not have the necessary structural strength and a metal, such as aluminum, would not have the necessary thermal properties The fiberglass, or glass reinforced polyester, has a longitudinal modulus of 65,000 psi and a transverse modulus of 10,200 psi. The thermal conductivity is 4.5 btu./ft$^2$/hr./° F./inch. This is compared to the characteristics of PVC which is also not as weatherable or dimensionally stable as pultruded fiberglass. PVC has a tensile strength in both the longitudinal and transverse direction of 6,500 psi and a thermal conductivity of 1.2 btu/ft$^2$/hr./° F./inch. It can be seen that while the thermal characteristics are acceptable, the tensile strength is not acceptable. The properties of 6063-tg aluminum do have an acceptable tensile strength of 30,000 psi, but an unacceptable thermal conductivity of 1,200 btu/ft$^2$/hr./° F./inch. It can therefore be seen that the fiberglass pultrusion has the advantages of structural strength and low thermal conductivity. Still further, the fiberglass pultrusion is very weatherable This combination allows for the use of a single profile concept, extending from the inside to the outside without getting excessive heat loss and frost on the inside. Further advantages of a pultrusion fiberglass sash member over molded fiberglass are that the pultrusion is more cost effective and it is also easier to control the dimensions of the profile during manufacture. The frame 12 comprises a top member 12d having a downwardly depending tip 12e. A side member 12f has a first end operatively connected to the top member 12d and a second end operatively connected to a bottom member 12g. The bottom member 12g has a flange 12h which is generally parallel to the bottom member 12g but is slightly offset therefrom. The top member 12d, tip 12e, side 12f, bottom member 12g and flange 12h form a generally C-shaped member which has a cavity 12j into which the double pane of glass is positioned. A watershed member 12k is operatively connected to the side 12f and depends generally outward and downward from the side 12f. The watershed member 12k has a tip 12m at the end opposite the connection to the side 12f. The tip 12m has an inward protrusion 12n which, with the watershed member 12k, forms a first corner surface designated as 15. The watershed 12k and the side member 12f form a second corner surface designated as 16. A condensation channel is formed by channel member 12p which has a first end operatively connected to the bottom member 12g, a middle section, and an upwardly extending second end. The channel 12p is positioned generally inward from the end of the flange 12h to collect any condensation which may form on the glass which would drip into the channel 12p. An attachment flange 12r is operatively connected to the condensation channel 12p and extends generally downward therefrom. A drywall return 12s is operatively connected to the bottom of the attachment flange 12r. The return 12s has a downwardly depending lip 12t.

Figure 4:
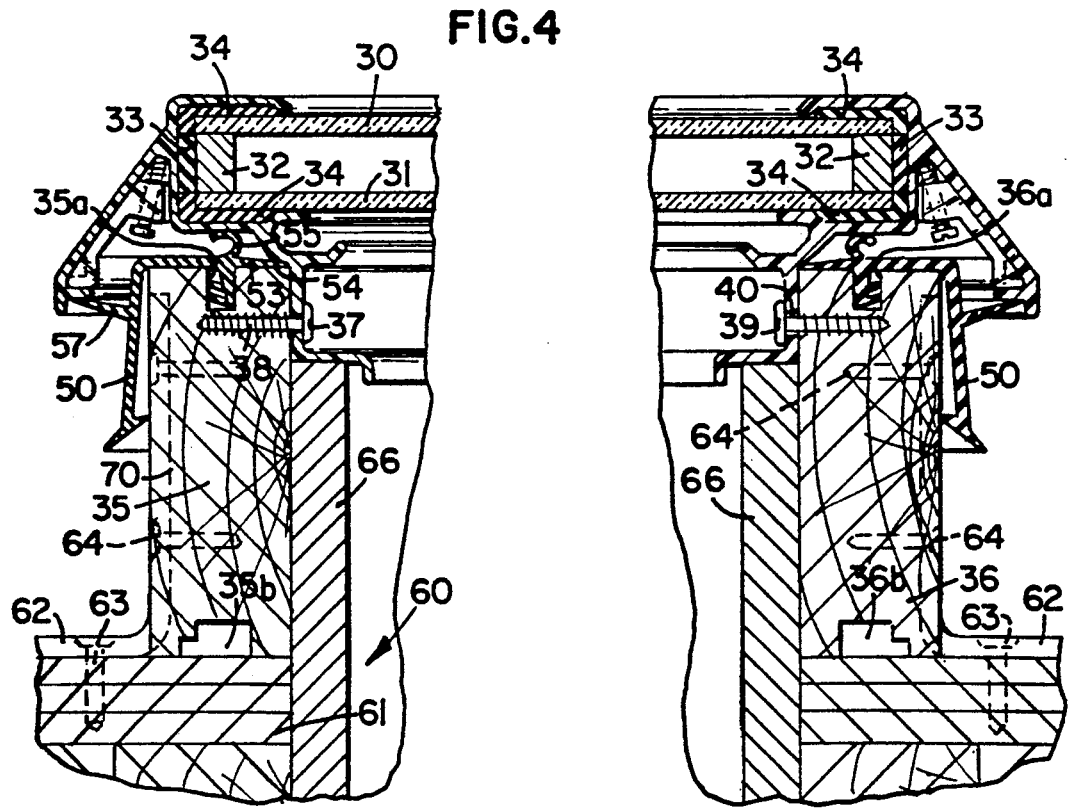
FIG. 4 is a cross-sectional view taken generally along the lines 4-4 of FIG. 3.

FIG. 3 shows the four pultruded fiberglass sash members 11, 12, 13 and 14 operatively connected by corner locks 20, as will be explained more fully hereinafter. Referring now to FIG. 4, a first pane of glass 30 and a second pane of glass 31 are positioned in the cavity 12j formed in pultruded fiberglass sash member 12 as well as similar cavities formed in the other pultruded fiberglass sash members 11, 13 and 14. Aluminum glass spacers 32 are positioned around the perimeter of the panes 30 and 31. Foam members 33 are positioned between the spacers 32 and the sides of the pultruded fiberglass sash members for example 12f. A silicon glaze 34 is then dispensed between the pane 30 and the top members of the pultruded fiberglass sash members, i.e. 12d, and also between the pane 31 and the bottom members of the pultruded fiberglass sash members, i.e. 12g. The aluminum glass spacers 32 are not positioned over the flanges of the sash members, i.e. 12h, but are instead recessed and are positioned so that the spacers 32 are as far away as possible from the glass that is exposed to room air. The glass which is exposed to room air is the glass between the flanges 12h. By recessing the glass spacer 32 in the cavity of the sash members, i.e. 12j, the thermal transfer is reduced and therefore results in less condensation being formed on the glass. The glass 30, glass 31, spacers 32, foam members 33 and glaze 34 form what is referred to as a glass unit However, it is understood other suitable substitutes may be utilized such as a single pane of glass, triple pane of glass or plastic for the glass.

The pultruded fiberglass sash members 11-14 are operatively connected to a frame, as best shown in FIG. 4. Two members of the frame are shown in FIG. 4, but it is of course recognized by one skilled in the art there are two additional frame members which would be under pultruded fiberglass sash members 11 and 13 to form a rectangular shape which would of course match the shape of the connected pultruded fiberglass sash member. Frame member 35 is operatively connected to the pultruded fiberglass sash member 14 and frame member 36 is operatively connected to the pultruded fiberglass sash member 12. The pultruded fiberglass sash members 11-14 have an opening in the attachment flange through which a screw is inserted into the frame member. As shown in FIG. 4, a screw 37 is inserted through an opening 38 in the attachment flange 12r of the pultruded fiberglass sash member 12. The screw 37 secures the pultruded fiberglass sash member 14 to the frame 35. Similarly, screw 39 is inserted through an opening 40 in the attachment flange of pultruded fiberglass sash member 14 into the frame member 36.

During assembly, prior to the assembly of the sash members 11-14 to the frame, a gasket 50 is secured to the frame. The four frame members are generally rectangular in cross section but have a notch 35a and 36a cut out at the top and a sheetrock return notch 35b and 36b cut out at the bottom. The frame members under pultruded fiberglass sash members 11 and 13 have similar notches and accordingly, there is a continuous notch which runs around the top of the frame members as well as the bottom of the frame members. A continuous gasket or weatherstrip 50 is made of EPDM (ethylene propylene diene monomer) rubber or other suitable material. The cross section of the gasket 50 is seen most clearly in FIGS. 4, 5a and 5b. An attachment member 51 is sized to form a friction fit with the notch 35a. The attachment member 51 has deformable protrusions 52 which allow for the attachment member 51 to be inserted into the notch 35a more easily but still resist being removed. A top member 53 is connected to the attachment member 52 and is configured to lay on the top of the frame members. The top member 53 has a tip 54 which contacts the bottom on the condensation channel of the pultruded fiberglass sash members. A primary weather seal extension 55 is operatively connected to the top member 53 and is positioned just above the attachment member 51. The extension member 55 is curved and is deformed downward when the bottom member, i.e. 12g, contacts it. A downwardly extending flashing engagement member 56 is operatively connected to the top member 53. The flashing engagement member 56 has an angled engagement member 56a for engaging the flashing, which will be described more fully hereafter. A secondary weatherstrip extension 57 is operatively connected to the flashing engagement member 56 and extends outward and slightly upward for engagement underneath the protrusion of the sash members, i.e. 12n. The tip 54 is the third point of weatherstrip protection. The gasket 50 is preferably formed of one piece and is injected molded at the corners to form a single piece rectangular gasket.

The frame is operatively connected to cover an opening 60 in a roof structure 61. 90° angle brackets 62 have a first leg which is operatively connected to the roof structure 61 by means of screws 63 and a second leg which is operatively connected to the frame members, i.e. 35 and 36, by means of screws 64. A recess 70 is formed in the frame members, i.e. 35 and 36, so that the second leg of the angle bracket 62 does not extend beyond the frame member itself. This provides for a flush mounting of the angle bracket so that it does not protrude from the frame members, i.e. 35 and 36. During installation, flashing (not shown) is positioned along the outside surface of the frame members, i.e. 35 and 36, underneath the flashing engagement member 56.

The corner locks 20, which are used to secure the pultruded fiberglass sash members together are shown in FIGS. 1 and 2. FIGS. 5a and 5b show the corner lock in two of its positions. Preferably, the corner lock is formed from a single unitary piece of plastic As can be seen clearly in FIG. 2, the corner lock 20 forms a 90° angle. This would of course be dependent upon the angle formed by the pultruded fiberglass sash members 11-14 For the majority of windows, these would be 90°, but it is also possible to have other angles. The corner lock 20 has a first leg 21 having a first end 21a and a second end 21b. A second leg 22 similarly has a first end 22a and a second end 22b. The first ends 21a and 22a are operatively connected to each other at an intersection, and preferably are formed of a single unitary piece.

Each leg member has a first planar surface 21c, 22c. As will be discussed more fully hereafter, the first planar surface, 21c or 22c, is adapted to engage the top surface of the protrusion 12n and generally conforms in shape for mating acceptance to the first corner surface 15. The back surface 21d of section 21e is positioned against the inside surface of the watershed 12k. The bottom section 21f has a threaded aperture 21g through which a threaded screw 92 is inserted. The back surface 22d of section 22e is positioned against the watershed of the pultruded fiberglass sash member. The bottom section 22f has a threaded aperture 22g through which a threaded screw 93 is inserted. The bottom sections 21f and 22f each have an elongate cutout at 21j, 22j. Similar cutouts (not shown) may be positioned proximate the screws 92 and 93. The purpose of the cutouts is to maintain a more uniform wall thickness so that the cycle time in manufacturing is lower. The shape of the leg member 21 generally conforms to a portion of the cavity 12c. Similarly, the second leg 22 conforms in shape to a comparable cavity in the adjacent pultruded fiberglass sash member. A groove 96 is formed at the intersection of the leg members 21 and 22. The groove 96 is adjacent the pultruded fiberglass sash member intersection. The four pultruded fiberglass sash members are sealed with a silicone sealant. If there are burrs at the mitred ends of the sash members, the groove 96 provides a place for the burrs to be positioned so when the corner locks are tightened the burrs do not force open the mitre.

The operation of the corner lock 20 is best seen in FIGS. 5a and 5b which show the sequence of assembly. It should be recognized that while FIG. 5a is consistent with the orientation of the skylight assembly shown in FIGS. 3 and 4, to represent the process during assembly FIGS. 5a and 5b should be turned upside down. The corner lock 20 is sized slightly smaller than the cavities formed by the pultruded fiberglass sash members i.e. 12j so that the second leg may be slid into one of the cavities and the first leg being slid into the similar cavity of the adjacent pultruded fiberglass sash member. Since the corner lock 20 is slightly smaller than the cavities, there is not a friction fit between the corner lock and the cavities of the pultruded fiberglass sash members. Keeping in mind that FIG. 5a should be rotated 180°, gravity will tend to force corner lock 20 into the bottom section 12f and is then a distance $X_1$ from the second corner 16. Further, the first planar surface 22c is at a distance Y from the protrusion 12n. Finally, the bottom section 22f is also flush against the outside surface of the side 12f. In this position, the corner lock 20 is not engaged and is not securing the pultruded fiberglass sash members to each other.

Then, the screw 93 is rotated clockwise so as to advance the screw through the threaded aperture 22g. This wedges the first planar surface 22c against the protrusion 12n and locks the second leg 22 into the cavity 12j of the pultruded fiberglass sash member 12. Similarly, the first leg 21 would be tightened into the adjacent pultruded fiberglass sash member 11 by rotating screw 92. As can be seen in FIG. 3b, the distance $X_2$ is now greater because the corner lock 20 has been wedged against the protrusion 12n to lock the pultruded fiberglass sash members into position. The corner lock has moved away from the side 12f by a distance Z. The corner lock 20 provides for a corner lock that is easy to use in a manner that does not require holes or apertures through the pultruded fiberglass sash members.

In assembling the pultruded fiberglass sash members 11-14 four corner locks 20 are utilized. The pultruded fiberglass sash members, as previously stated, have an opening and channel cavity at their mitered ends. The corner locks are sized to be placed in the channel cavities of adjacent pultruded fiberglass sash members. The first leg of the corner lock is in one cavity and the second leg is in the adjacent cavity.

The fastening members or screws 92 and 93 are tightened and the fastening members engage the first corner surfaces and move both the leg members against the second corner surfaces, thereby tightening and securing the pultruded fiberglass sash members together without the necessity of holes being formed in the pultruded fiberglass sash members 11-14. Therefore, no unsightly holes are seen in the outside of the sash members. The screws are of a harder material than the pultruded fiberglass sash members. Therefore, upon still further tightening, the screws 92 and 93 penetrate the pultruded fiberglass sash members to further lock the pultruded fiberglass sash members in relative position to one another.

When the skylight assembly 10 is secured to the roof structure 61 to cover the opening 60, the window unit, sash members and frame are all one unit. The skylight assembly 10 is then secured by means of screws 63 through the bracket 62 and into the roof 61. The bracket 62 is then secured into the recess 70 of the frame by means of screws 64. As shown in FIG. 4, the drywall 66 is positioned adjacent the frame 35 and 36 and is located underneath the drywall return 12s. It is understood that other suitable interior finish material may be used instead of drywall The lip 12t comes down past the drywall 66 and provides for an aesthetically pleasing finish, even if the top of the drywall 66 is jagged. The frame 35 and 36b also have a notch 35b and 36c which may be utilized for alternately positioning drywall. While not shown, it is easily understood how the frame 35 and 36, if closer together, would extend such that the notches 35b and 36b would extend inside of the roof opening 60 such that the drywall 66 could be positioned inside of the notch 35b and 36b. The installer therefore has two options as to how to finish off the skylight assembly with drywall. If it is necessary to replace the glass unit and/or sash members after initial installation, it is possible to do so from inside the building. Screws 37 and 39 are removed from the frame 35 and 36. Then the entire sash (glass unit and sash members) may be removed and replaced.

The simplicity of the single profile sash member construction is very advantageous. Having one profile that performs all of the functions of watershed, glass enclosure, weatherseal, condensation channel, attachment flange and sheetrock return is a great advantage over having a number of separate parts and pieces fastened together to perform these functions. By so doing, manufacturing complexity is significantly reduced and tolerance problems caused by fitting parts together is eliminated. Further, the unsightly appearance caused by using numerous parts and fasteners is eliminated. The leakage and other performance problems caused by fastening many parts together instead of using one homogeneous piece are similarly avoided.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

We claim:

1. A corner fastener for use in securing first and second sash members together to form a corner of a sash, the sash members each having a mitred end and each sash member forming an opening and channel cavity at its mitred end, said channel cavities being a first channel cavity in said first sash member and a second channel cavity in said second sash member, said channel cavities having first corner surfaces and second, opposite corner surfaces, said fastener comprising:
   (a) a first leg member having first and second ends and a second leg member having first and second ends, said first ends operatively connected to each other at an intersection;
   (b) said leg members generally conforming to a portion of the shape of said channel cavities;
   (c) said leg members each having a threaded aperture formed therein for receiving fastening members, said threaded apertures in general alignment to intersect the respective first corner surfaces; and
   (d) wherein when the fastening members are tightened in said threaded apertures, the fastening members engage the first corner surfaces and move said leg members against said second corner surfaces, thereby tightening and securing the sash members together without the necessity of holes being formed in the sash members.

2. The corner fastener of claim 1, wherein said fastener is constructed from plastic.

3. The corner fastener of claim 1, wherein said corner fastener is a unitary, single piece fastener.

4. The corner fastener of claim 1, wherein when said fastening members are tightened said fastening members penetrate the sash members to further lock the sash members.

5. The corner fastener of claim 1, wherein said leg members are sized to enter said channel cavities without a friction fit.

6. The corner lock of claim 3, further comprising a recess being formed at the intersection of said leg members, said recess adjacent said sash members.

7. A plastic, unitary, single piece corner fastener for use in securing first and second sash members together to form a corner of a sash, the sash members each having a mitred end and each sash member forming an opening and channel cavity at its mitred end, said channel cavities being a first channel cavity in said first sash member and a second channel cavity in said second sash member, said channel cavities having first corner surfaces and second, opposite corner surfaces, said fastener comprising:
   (a) a first leg member having first and second ends and a second leg member having first and second ends, said first ends operatively connected to each other at an intersection;
   (b) said leg members generally conforming to a portion of the shape of said channel cavities;
   (c) said leg members each having a threaded aperture formed therein for receiving fastening members, said threaded apertures in general alignment to intersect the respective first corner surfaces; and
   (d) wherein when the fastening members are tightened in said threaded apertures, the fastening members engage the first corner surfaces and move said leg members against said second corner surfaces, thereby tightening and securing the sash members together without the necessity of holes being formed in the sash members;
   (e) wherein when said fastening members are tightened said fastening members penetrate the sash members to further lock the sash members;
   (f) said leg members are sized to enter said channel cavities without a friction fit; and
   (g) a recess being formed at the intersection of said leg members, said recess adjacent said sash members.

* * * * *

UNITED STATES PATENT AND TRADEMARK OFFICE
CERTIFICATE OF CORRECTION

PATENT NO. : 5,150,983

DATED : September 29, 1992

INVENTOR(S) : David R. Bogenhagen

It is certified that error appears in the above-identified patent and that said Letters Patent is hereby corrected as shown below:

In column 1, line 28, after "bers" please insert --,--.
In column 1, line 28, after the word "mitre" please insert --,--.

In column 2, line 2, after the word "member" and before the word "the" please insert --of--.

In column 7, line 14, please delete "36b" and substitute therefore --36--.

In column 7, line 14, please delete "36c" and substitute therefore --36b--.

Signed and Sealed this

Seventh Day of December, 1993

Attest:

BRUCE LEHMAN

Attesting Officer

Commissioner of Patents and Trademarks